(12) United States Patent
Friedlander

(10) Patent No.: US 8,135,618 B1
(45) Date of Patent: Mar. 13, 2012

(54) SYSTEM AND METHOD FOR DYNAMIC CONTENT DELIVERY

(75) Inventor: Meir Friedlander, Palo Alto, CA (US)

(73) Assignee: Amdocs Software Systems Limited, Dublin (IE)

( * ) Notice: Subject to any disclaimer, the term of this patent is extended or adjusted under 35 U.S.C. 154(b) by 470 days.

(21) Appl. No.: 11/211,796

(22) Filed: Aug. 24, 2005

Related U.S. Application Data

(60) Provisional application No. 60/705,905, filed on Aug. 4, 2005.

(51) Int. Cl.
*G06F 15/16* (2006.01)

(52) U.S. Cl. .................. 705/14.46; 705/14.41; 707/784; 707/732

(58) Field of Classification Search .................. None
See application file for complete search history.

(56) References Cited

U.S. PATENT DOCUMENTS

| | | | | |
|---|---|---|---|---|
| 5,724,521 | A | * | 3/1998 | Dedrick ......................... 705/26 |
| 5,974,398 | A | * | 10/1999 | Hanson et al. .................. 705/14 |
| 6,971,973 | B2 | * | 12/2005 | Cohen et al. ...................... 482/8 |
| 7,117,212 | B2 | * | 10/2006 | Frumusa et al. ................ 707/10 |
| 7,793,326 | B2 | * | 9/2010 | McCoskey et al. ............. 725/91 |
| 2003/0018969 | A1 | * | 1/2003 | Humpleman et al. .......... 725/34 |
| 2003/0028889 | A1 | * | 2/2003 | McCoskey et al. ............. 725/91 |
| 2004/0003097 | A1 | * | 1/2004 | Willis et al. ................... 709/228 |
| 2004/0181535 | A1 | * | 9/2004 | Frumusa et al. .............. 707/100 |
| 2004/0260767 | A1 | * | 12/2004 | Kedem et al. ................. 709/203 |

FOREIGN PATENT DOCUMENTS

WO   WO 01/03041 A1   1/2001

* cited by examiner

*Primary Examiner* — Farhan Syed
(74) *Attorney, Agent, or Firm* — Zilka-Kotab, PC

(57) ABSTRACT

A system, method and computer program product are provided for dynamic content delivery. Initially, at a first point in time, content is received with metadata, utilizing a network. In use, at a second point in time (after the first point in time), at least one aspect of the delivery of the content, may be controlled and/or modified utilizing the metadata. To this end, at least one aspect of the delivery of the content (which may, as an option, even include the content itself) may be updated and/or made current.

12 Claims, 4 Drawing Sheets

SYSTEM AND METHOD FOR DYNAMIC CONTENT DELIVERY

The present application claims priority off of a provisional application filed Aug. 4, 2005 under U.S. Provisional Application No. 60/705,905, which is incorporated herein by reference in its entirety for all purposes.

FIELD AND BACKGROUND OF THE INVENTION

The present invention relates to content delivery, and more particularly, to dynamically delivering content.

The personal video recorder (PVR), also called a digital video recorder (DVR), is a consumer electronics device that records television content to a hard disk in a digital format. Since first introduced by TiVo® at the Consumer Electronics Show in 1999, PVRs have steadily developed complementary abilities, such as recording onto DVDs. Internet Protocol television (IPTV) personalized services, such as the nPVR, event summaries (e.g. sports, news, reality shows, etc.), re-purposed content on demand, etc. contain many potential in-line and on-screen spots for potential commercials. More than that, most original content already has time-line based commercials included in the original casted signal.

Unfortunately, in a time shifted environment, the original commercials, whether local or high value national commercials, might not be relevant after a predetermined point in time. Further, related information such as hyperlinks and other data might not be accurate, and advertisement assumptions made at time of original usage (e.g. the time of the day, the rendering device, the user, etc.) may be different at a later time.

There is thus a need for overcoming these and/or other problems associated with the prior art.

SUMMARY

A system, method and computer program product are provided for dynamic content delivery. Initially, at a first point in time, content is received with metadata, utilizing a network. In use, at a second point in time (after the first point in time), at least one aspect of the delivery of the content, may be controlled and/or modified utilizing the metadata. To this end, at least one aspect of the delivery of the content (which may, as an option, even include the content itself) may be updated and/or made current.

DETAILED DESCRIPTION

Figure 1:
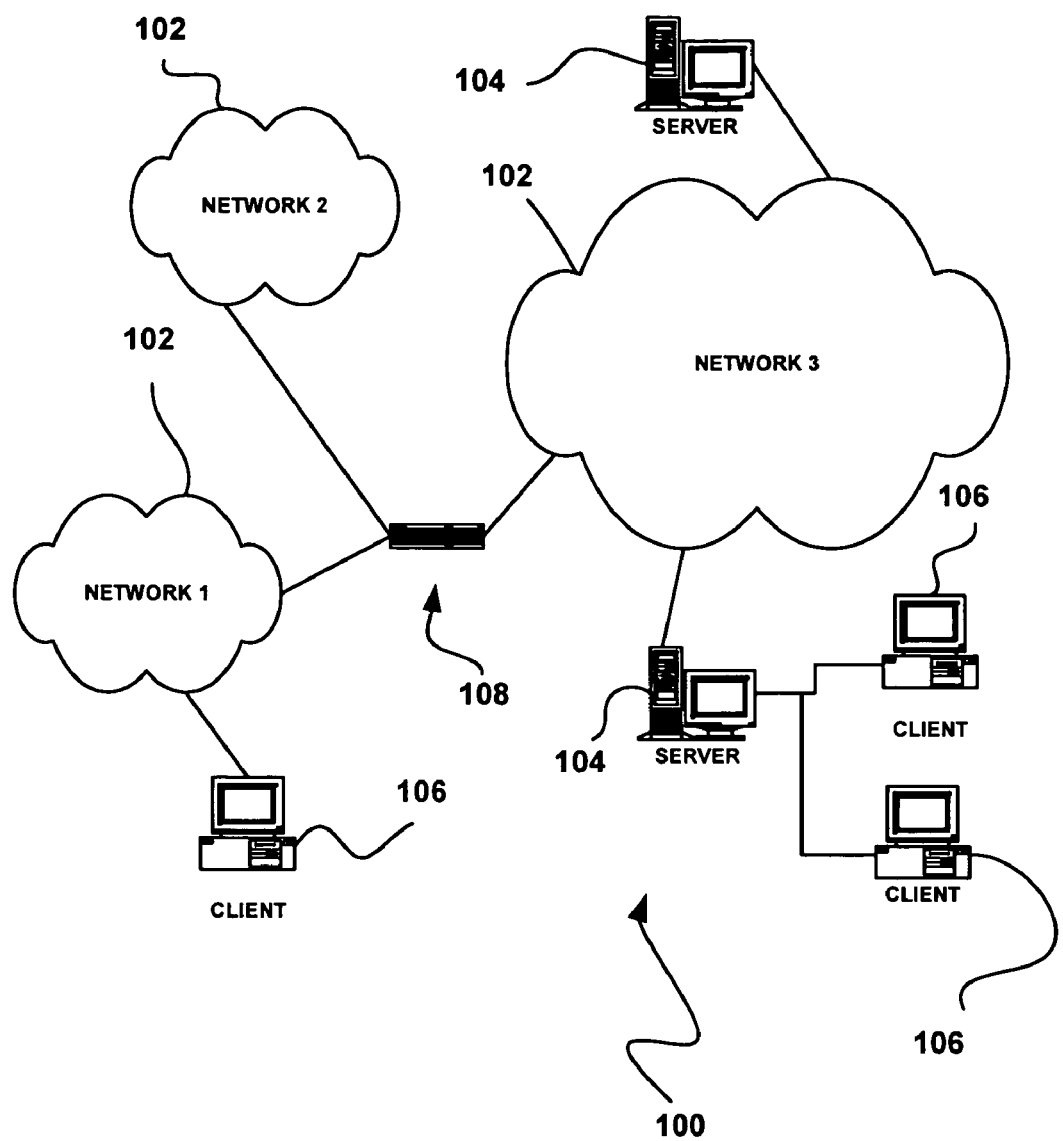
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), wireless network (e.g. satellite network, etc.), wide area network (WAN) such as the Internet, cable network (e.g. cable video delivery network, etc.), television network, etc.

Coupled to the networks 102 are server devices 104 which are capable of communicating over the networks 102. Also coupled to the networks 102 and the server devices 104 is a plurality of client devices 106. Such client devices 106 may each include a desktop computer, lap-top computer, hand-held computer, mobile phone, hand-held computer, personal video recorder (PVR), digital set top box, digital media [e.g. compact disc (CD), digital video disc (DVD), MP3, etc.] player, printer, and/or any other type of logic. In order to facilitate communication among the networks 102, at least one gateway or router 108 is optionally coupled therebetween.

Further, it should be noted that at least a portion of the foregoing network devices in the present network architecture 100 may be configured for dynamic content delivery. Initially, at a first point in time, content is received with metadata, utilizing a network. In the context of the present description, such metadata may include any data that is associated with the content for controlling at least one aspect thereof. In use, at a second point in time after the first, such at least one aspect of the delivery of the content is controlled for personalizing a user experience, etc., utilizing the metadata. Further in the context of the present description, the term delivery may refer to any act or operation that leads up to, initiates, and/or performs the conveyance of the content to the user, including, but not limited to, the content itself, any part of the content, the content appearance to the user, etc.

More illustrative information will now be set forth regarding various optional architectures and features with which the foregoing technique which may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
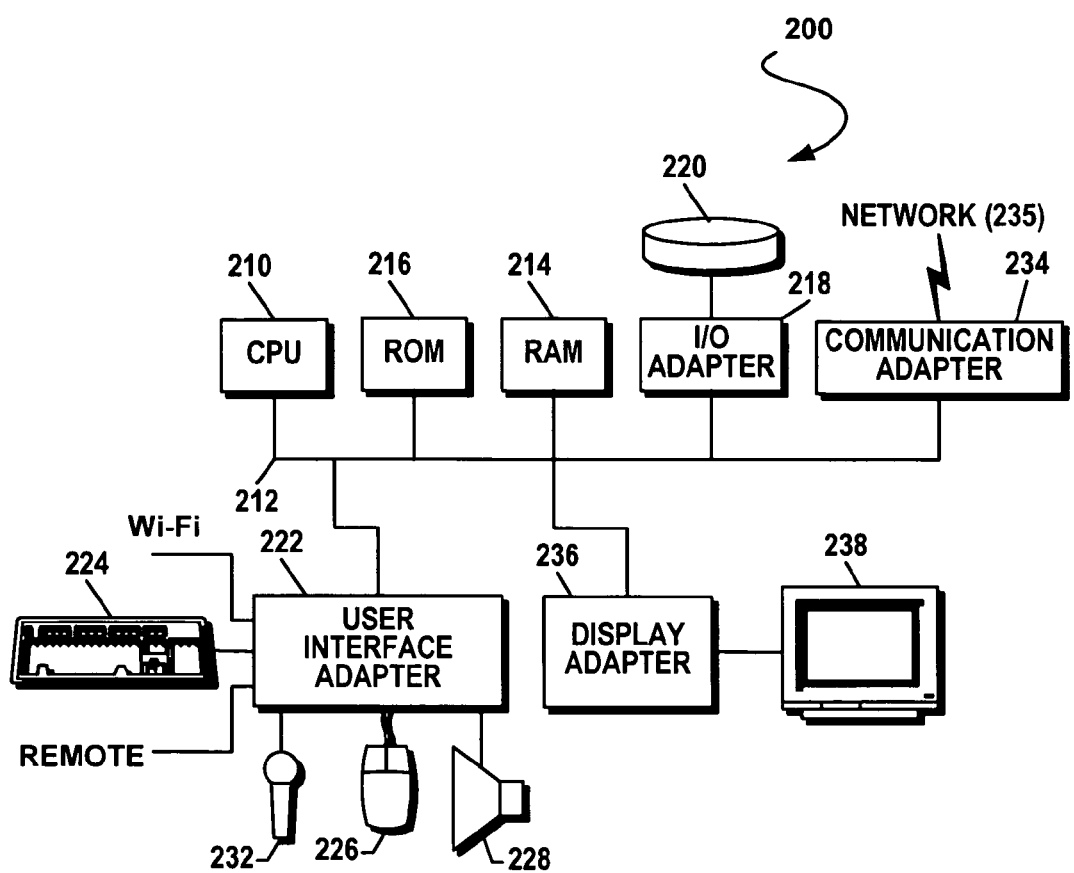
FIG. 2 shows a representative hardware environment that may be associated with the server devices and/or client devices of FIG. 1, in accordance with one embodiment.

FIG. 2 shows a representative hardware environment that may be associated with the server devices 104 and/or client devices 106 of FIG. 1, in accordance with one embodiment. Such figure illustrates a possible hardware configuration in accordance with one embodiment having a central processing unit 210, such as a microprocessor, and a number of other units interconnected via a system bus 212.

While various other components are shown in FIG. 2, it should be understood that the various depicted components may be omitted, and other components may be incorporated. For example, depending on the nature of the device (e.g. desktop computer, lap-top computer, hand-held computer, mobile phone, hand-held computer, PVR, digital set top box, digital media player, etc.), various components may be added and/or omitted. Still yet, additional instances of the various components (e.g. central processing unit 210, etc.) shown may be provided for redundancy and enhancement purposes, etc.

The device shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown), Wi-Fi, a remote control device, etc. to the bus 212, communication adapter 234 for connecting the workstation to a communication network 235 (e.g., a data processing network) and a display adapter 236 for connecting the bus 212 to a display device 238. While not shown, middleware may further be provided for interfacing the operating system, etc.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, middleware, or any desired combination thereof. For that matter, any type of logic may be utilized which is capable of implementing the various functionality set forth herein.

Figure 3:
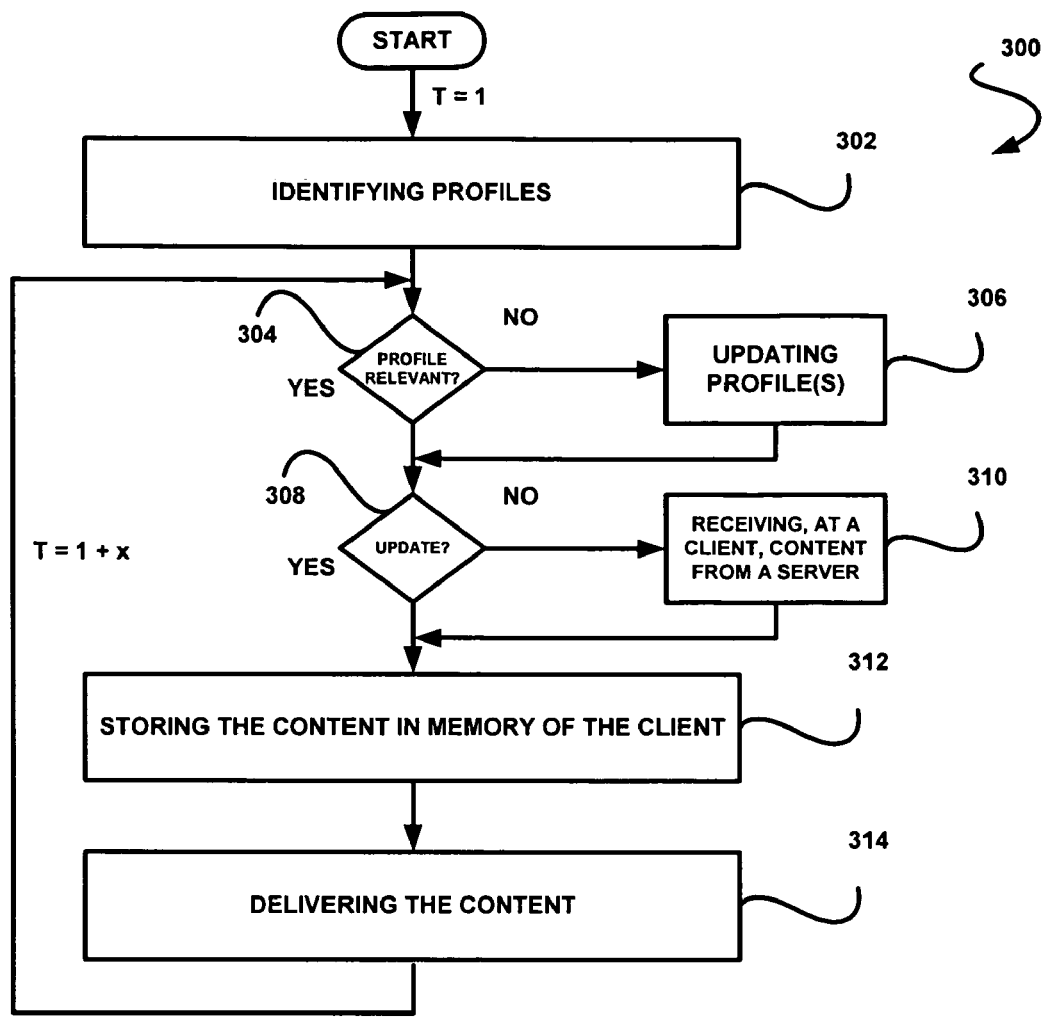
FIG. 3 shows a method for dynamic content delivery, in accordance with one embodiment.

FIG. 3 shows a method 300 for dynamic content delivery, in accordance with one embodiment. As an option, the method 300 may be implemented in the context of the architecture and environment of FIGS. 1 and/or 2. Of course, however, the method 300 may be carried out in any desired environment.

As shown, in operation 302, at least one profile is identified. As will soon become apparent, such profile may be used to dynamically deliver content to a user. It should be further noted that the profile may be established at any desired time. For example, the profile may be identified when a new client device (e.g. see, for example, client device 106 of FIG. 1, etc.) is added to a network (e.g. see, for example, networks 102 of FIG. 1, etc.), a new user utilizes an existing client device, and/or any other desired triggering event (e.g. content usage, a user reaching a particular point/location in the content, etc.). As will also become apparent, such profile may also be updated and continuously built upon as a function of time/date and/or various triggering events (e.g. between the first and second point in time, etc.). To this end, the profile may optionally be dynamic and constantly changing as a function of an interaction between the user and the client device, time, etc.

It should be noted that the profile may be stored on the client device, a server device (e.g. see, for example, server device 104 of FIG. 1, etc.), and/or any desired location (e.g. edge remote storage, etc.). In an embodiment where the profile is stored at the server device, periodic communication between the client device and the server may be necessary.

As a first example of a profile, a client profile of a client device may be identified. Such client profile may include various information describing the client device including, but not limited to content on the client device, hardware information (e.g. processor speed and/or type, memory size, power requirements, bandwidth capabilities, display type, etc.), software information (e.g. software application identifiers, version numbers, diagnostics, etc.), and/or any other information relating to any aspect of the client device.

As yet another example, a user profile of a user of the client device may be identified in operation 302. The user profile may include, but is not limited to a gender identifier, age identifier, hobbies/interests information, demographic information, current location, and/or any other information relating at least one aspect of the user.

Still yet, in accordance with another embodiment, a usage profile of the client device may be identified. The usage profile, in one embodiment, may include information related to content stored on the client and the manner in which such content is accessed by the user. For example, a list of content may be provided, a frequency, duration and number of times in which each content was accessed, as well as any other information relating to the usage of the client device by the user. Of course, different usage profiles may be established for different users. It is also contemplated that one or more group usage profiles may be included which collectively describe a select group of users.

As mentioned earlier, any of the profiles may be updated. Specifically, in decision 304, it is determined whether a relevancy of the client profile, the user profile, and/or the usage profile is current. It should be noted that such determination may be static or dynamic. For example, the decision 304 may be made based on a predetermined time schedule (e.g. periodic, etc.), or it may be made as a function of various changing parameters. In particular, if a parameter associated with user activity in relation to the client device exceeds a predetermined threshold, indicates a triggering event, etc., the decision 304 may be made to update the profile.

To this end, if it is determined in decision 304 that the profile is to be updated, such may be carried out. See operation 306. In an embodiment where the profile is stored at the server device, the update process in operation 306 may further include sending a copy of the updated profile to the server device.

With the profile established and identified, the client device may receive content from the server device in operation 310, utilizing the network, based on whether an update is available. See decision 308. Again, similar to the profiles, the content may be statically and/or dynamically updated. Still yet, the content update may be prompted by a service provider, a content owner (e.g. studio, network, advertiser, etc.), and/or any other authorized desired party. As yet a further option, each updated content may be stored and maintained, thus creating multiple generations of content. Of course, it is also contemplated that older content may be simply erased in favor of newer, updated content.

In the context of the present description, content may refer to advertisements, commercials, directories, and/or any other data/code (e.g. music, videos, images, text, and/or anything else capable of being delivered to the user) that is to be delivered to the user via the client device.

The content information may further include metadata. Such metadata may, in turn, include different rules that govern various aspects of the content, the delivery thereof, and/or a business model associated with such delivery. For example, the rules may include delivery rules for controlling at least one aspect of the delivery of the content based on the profile (s). In an embodiment where multiple generations of content exist, there may be separate rules included for different generations of the content.

Further provided may be revenue sharing rules for calculating revenue distribution amongst a plurality of parties in accordance with a contract, etc. In various embodiments, such parties may include a content provider who owns the content (e.g. advertiser, etc.), the service provider who controls operation of the server device, and/or even the user of the client device. Thus, in use, the content may be selected and delivered in a dynamic manner that provides optimal value for the service provider and the content owner, etc. Further, different rule "packages" or sets may be offered by service providers and commercial owners with various pricing. Still yet, the original commercial "spot owner" may delegate or sell the right for a spot after a certain time, or a generation of content to another "spot owner." Further, the end user might be charged or credited upon his/her behavior during a commercial "play."

In some embodiments, the aforementioned rules may control the various aspects of the content as a function of the profile. In other words, the rules may be applied to a current profile (as well as any other desired factors such as time of day, date, etc.), in determining the manner in which present system is to be governed.

Thus, in use, the rules may govern the delivery of content via various techniques including, but not limited to time in-line, screen space location, bottom or top screen banner, after a search, during a "dead time" [e.g. when content is paused, while a content search is being conducted, during an electronic programming guide (EPG) session, etc.], during a directory search, during trick modes, etc. Further, the most relevant content may be selected for delivery based on various factors including, but not limited to content history and generation, time of the day, original content history and metadata, user exposable characteristics, etc. Still yet, once the user uses the content (e.g. through watching, clicking, hyper-linking, browsing, etc), such information may be saved for a future revenue transaction.

In operation 312, the content is stored. In one embodiment, the content may be stored in memory of the client device.

To this end, the content is delivered in operation 314 as a function of the rules and the profile, as well as the various other factors mentioned hereinabove. Again, the term delivery may refer to any act or operation that leads up to, initiates, and/or performs the conveyance of the content to the user. Just by way of example, in one embodiment, the delivery may take the form of streaming (statically or dynamically) data.

Further, the content may further be delivered in conjunction with and possibly as a function of a second set of content (e.g. normal programming, etc.) that is currently or is going to be delivered to the user via the client device. Just by way of a non-limiting example, the first set of content delivered in operation 314 may include advertising or commercial material, while the aforementioned second set of content may include a movie, etc. Again, the second set of content may refer to any data and/or code (e.g. music, videos, images, text, etc.) that is to be delivered to the user via the client device.

In one embodiment, the second set of content may be transmitted from the server device to the client device independently of the first set of content. For example, the second set of content may include streaming video, while the first set of content may be updated on demand and/or via any other desired manner mentioned hereinabove. To this end, up-to-date content may always be available on the client device for delivery in conjunction with the normal programming, based on the rules, profile, etc.

Figure 4:
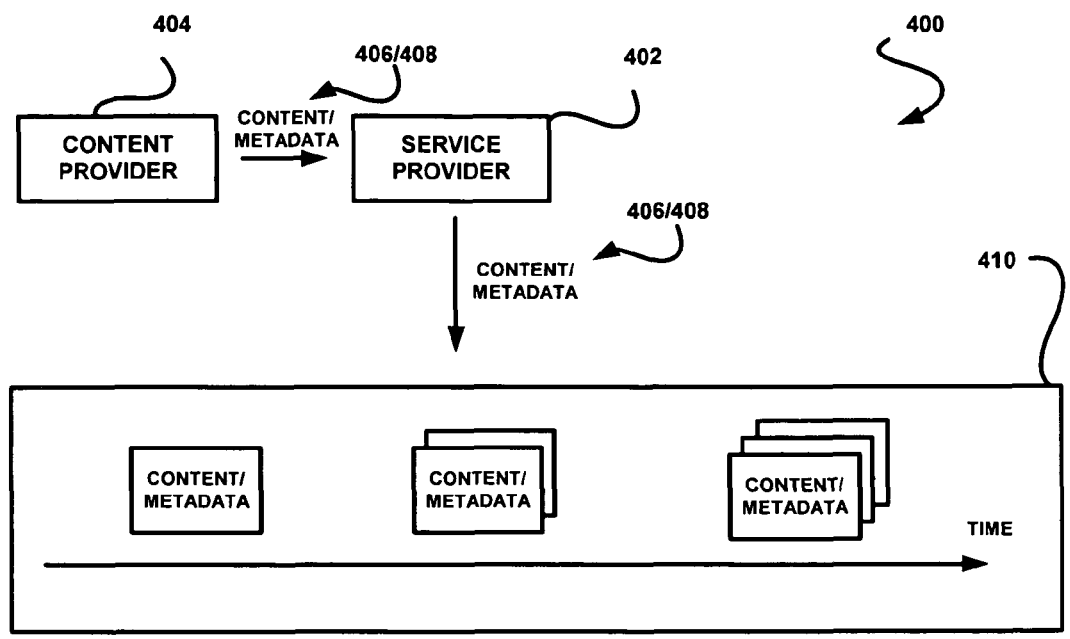
FIG. 4 shows an illustrative framework for carrying out dynamic content delivery, in accordance with one embodiment.

FIG. 4 shows an illustrative framework 400 for carrying out dynamic content delivery, in accordance with one embodiment. As an option, the framework 400 may be implemented in the context of the architecture and environment of FIGS. 1 and/or 2, and the method 300 of FIG. 3. Of course, however, the framework 400 may be carried out in any desired environment.

As shown, a service provider 402 receives content from a content provider 404. In the case where such content includes advertising information, the content provider 404 may include an advertiser. In concert with providing desired programming to the user over time, the service provider 402 continuously updates both content 406 and associated metadata 408 to a client device 410 which, in turn, dynamically controls at least one aspect of the delivery of the content 406 in association with the programming, utilizing the metadata 408.

While the content 406 and the metadata 408 are shown to be received and updated together, it should be noted that they may be optionally received and updated independently. For example, in one embodiment, after the content 406 (and even a first instance of the metadata 408) are sent to the client device, additional metadata 408 may be sent to the client device for altering the delivery. This may even occur after the content 406 has already been delivered.

By allowing for more granular control of content delivery, much more value is provided to an advertiser or other party. Further opportunity is also provided for more revenue (e.g. by view, by click or any other method, etc.) for the service provider and the content owner. Just by way of a non-limiting example, various "spots" may be sold (e.g. auctioned, etc.) to various parties, where delivery of the content associated with the "spots" may be controlled via the metadata.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

The invention claimed is:

1. A computer-implemented method, comprising:
    identifying a first user profile including:
        a gender identifier associated with a user of a client device,
        interests information associated with the user of the client device,
        demographic information associated with the user of the client device, and
        a current location associated with the user of the client device;
    identifying a second usage profile including:
        a frequency in which content stored on the client device is accessed by the user,
        a duration in which the content stored on the client device is accessed by the user, and
        a number of times in which the content stored on the client device is accessed by the user;
    identifying a third group profile associated with the user of the client device;
    dynamically determining whether a relevancy of the first user profile is current, based on at least one first parameter that changes over time;
    when it is dynamically determined that the relevancy of the first user profile is not current, updating the first user profile;
    dynamically determining whether a relevancy of the second usage profile is current;
    when it is dynamically determined that the relevancy of the second usage profile is not current, updating the second usage profile;
    dynamically determining whether a relevancy of the third group profile is current;
    when it is dynamically determined that the relevancy of the third group profile is not current, updating the third group profile;
    at a first point in time, receiving first content including first metadata utilizing a network, the first metadata including a first set of rules controlling a delivery of the first content and a first business model associated with the delivery of the first content, the first business model including first revenue sharing rules for calculating revenue distribution amongst a plurality of parties in accordance with a first contract, where the plurality of parties include a content provider who owns the first content and a service provider;
    storing the first content on the client device;

delivering the first content utilizing the client device, based on the first metadata, the first user profile, the second usage profile, and the third group profile;

at a second point in time after the first point in time, dynamically determining whether an update for the first content is available, based on at least one second parameter that changes over time, the first user profile, the second usage profile, and the third group profile;

when it is dynamically determined that the update for the first content is available, receiving updated content including second metadata, the second metadata including a second set of rules controlling a delivery of the updated content and a second business model associated with the delivery of the updated content, the second business model including second revenue sharing rules for calculating revenue distribution amongst the plurality of parties in accordance with a second contract;

storing the updated content, thereby creating multiple generations of content;

delivering the updated content utilizing the client device, based on the second metadata, the first user profile, the second usage profile, and the third group profile, for providing optimal value for the service provider and the content provider; and crediting an account of the user of the client device in response to a behavior of the user during delivery of the first content based on the first metadata, the first user profile, the second usage profile, and the third group profile.

2. The method as recited in claim 1, wherein the first metadata controls a modification of a portion of the first content, based on the first user profile.

3. The method as recited in claim 1, wherein the first metadata controls a modification of a portion of the first content, based on the second usage profile.

4. The method as recited in claim 1, wherein the first metadata controls a modification of a portion of the first content, based on a time of day.

5. The method as recited in claim 1, wherein the first metadata controls a modification of a portion of the first content, based on a date.

6. The method as recited in claim 1, wherein the first metadata controls a modification of a portion of the first content, based on at least one event that occurs between the first point in time and the second point in time.

7. The method as recited in claim 1, wherein the first set of rules controlling the delivery of the first content include rules for targeting advertisements.

8. The method as recited in claim 1, wherein the delivery of the first content is auctioned.

9. The method as recited in claim 1, wherein at least a portion of the first content is auctioned.

10. A computer program product embodied on a non-transitory computer readable storage medium, comprising:

computer code for identifying a first user profile including:
a gender identifier associated with a user of a client device,
interests information associated with the user of the client device,
demographic information associated with the user of the client device, and
a current location associated with the user of the client device;

computer code for identifying a second usage profile including:
a frequency in which content stored on the client device is accessed by the user,
a duration in which the content stored on the client device is accessed by the user, and
a number of times in which the content stored on the client device is accessed by the user;

computer code for identifying a third group profile associated with the user of the client device;

computer code for dynamically determining whether a relevancy of the first user profile is current, based on at least one first parameter that changes over time;

computer code for updating the first user profile when it is dynamically determined that the relevancy of the first user profile is not current;

computer code for dynamically determining whether a relevancy of the second usage profile is current;

computer code for updating the second usage profile when it is dynamically determined that the relevancy of the second usage profile is not current;

computer code for dynamically determining whether a relevancy of the third group profile is current;

computer code for updating the third group profile when it is dynamically determined that the relevancy of the third group profile is not current;

computer code for, at a first point in time, receiving first content including first metadata utilizing a network, the first metadata including a first set of rules controlling a delivery of the first content and a first business model associated with the delivery of the first content, the first business model including first revenue sharing rules for calculating revenue distribution amongst a plurality of parties in accordance with a first contract, where the plurality of parties include a content provider who owns the first content and a service provider;

computer code for storing the first content on the client device;

computer code for delivering the first content utilizing the client device, based on the first metadata, the first user profile, the second usage profile, and the third group profile;

computer code for, at a second point in time after the first point in time, dynamically determining whether an update for the first content is available, based on at least one second parameter that changes over time, the first user profile, the second usage profile, and the third group profile;

computer code for receiving updated content including second metadata when it is dynamically determined that the update for the first content is available, the second metadata including a second set of rules controlling a delivery of the updated content and a second business model associated with the delivery of the updated content, the second business model including second revenue sharing rules for calculating revenue distribution amongst the plurality of parties in accordance with a second contract;

computer code for storing the updated content, thereby creating multiple generations of content;

computer code for delivering the updated content utilizing the client device, based on the second metadata, the first user profile, the second usage profile, and the third group profile, for providing optimal value for the service provider and the content provider; and computer code for crediting an account of the user of the client device in response to a behavior of the user during delivery of the first content based on the first metadata, the first user profile, the second usage profile, and the third group profile.

11. A system including a non-transitory computer readable storage medium, comprising:
a client device for:
identifying a first user profile including:
a gender identifier associated with a user of a client device,
interests information associated with the user of the client device,
demographic information associated with the user of the client device, and
a current location associated with the user of the client device;
identifying a second usage profile including:
a frequency in which content stored on the client device is accessed by the user,
a duration in which the content stored on the client device is accessed by the user, and
a number of times in which the content stored on the client device is accessed by the user;
identifying a third group profile associated with the user of the client device;
dynamically determining whether a relevancy of the first user profile is current, based on at least one first parameter that changes over time;
when it is dynamically determined that the relevancy of the first user profile is not current, updating the first user profile;
dynamically determining whether a relevancy of the second usage profile is current;
when it is dynamically determined that the relevancy of the second usage profile is not current, updating the second usage profile;
dynamically determining whether a relevancy of the third group profile is current;
when it is dynamically determined that the relevancy of the third group profile is not current, updating the third group profile;
at a first point in time, receiving first content including first metadata utilizing a network, the first metadata including a first set of rules controlling a delivery of the first content and a first business model associated with the delivery of the first content, the first business model including first revenue sharing rules for calculating revenue distribution amongst a plurality of parties in accordance with a first contract, where the plurality of parties include a content provider who owns the first content and a service provider;
storing the first content on the client device;
delivering the first content utilizing the client device, based on the first metadata, the first user profile, the second usage profile, and the third group profile;
at a second point in time after the first point in time, dynamically determining whether an update for the first content is available, based on at least one second parameter that changes over time, the first user profile, the second usage profile, and the third group profile;
when it is dynamically determined that the update for the first content is available, receiving updated content including second metadata, the second metadata including a second set of rules controlling a delivery of the updated content and a second business model associated with the delivery of the updated content, the second business model including second revenue sharing rules for calculating revenue distribution amongst the plurality of parties in accordance with a second contract;
storing the updated content, thereby creating multiple generations of content;
delivering the updated content utilizing the client device, based on the second metadata, the first user profile, the second usage profile, and the third group profile, for providing optimal value for the service provider and the content provider; and
crediting an account of the user of the client device in response to a behavior of the user during delivery of the first content based on the first metadata, the first user profile, the second usage profile, and the third group profile.

12. The method of claim 1, wherein the updated content includes normal programming, and the delivery of the first content based on the first metadata, the first user profile, the second usage profile, and the third group profile is a function of the delivery of the updated content based on the second metadata, the first user profile, the second usage profile, and the third group profile, such that the delivery of the first content is based on an anticipated delivery of the updated content.

* * * * *